Patented Apr. 15, 1941

2,238,673

UNITED STATES PATENT OFFICE 2,238,673

PROCESS FOR THE TREATMENT OF TITANIUM CONTAINING IRON ORES

Ragnvald Asak, Vestre Aker, near Oslo, Norway, assignor to Christiania Spigerverk, Nydalen, near Oslo, Norway No Drawing. Application March 16, 1939, Serial No. 262,303. In Norway March 26, 1938

7 Claims. (Cl. 23—24)

The present invention relates to a process for the treatment of preferably concentrated titanium containing iron ores, which contain vanadium and in some cases chromium by subjecting the ore to a reducing treatment in the presence of an alkali compound, for example sodium carbonate, sodium chloride, sodium sulphate etc., whereby iron sponge is produced, and lixiviating the compounds rendered soluble.

It was formerly known in magnetic separation of iron ores containing vanadium that a concentration of this metal takes place in the magnetic concentrate, as the vanadium in the ore is present as $FeO.V_2O_3$ analogous to $FeO.Fe_2O_3$.

Further it was formerly known that the titanium and chormium oxides may be so finely divided in the magnetite that they can not be efficiently separated from the magnetite by grinding the ore very finely.

It was also formerly known that when the ores referred to are subjected to ordinary reducing treatment in a dry state with reducing gases, such as carbon monoxide, if desired in the presence of carbon mixed with the ore, the titanium, chromium and vanadium are not reduced to metal, but follow the iron as oxides.

It has also been proposed to reduce the ore in the presence of sodium carbonate in order to render the titanium, vanadium and chromium compounds present soluble. It has been proposed to remove the titanium compound from the iron sponge by a dissolving treatment with sulphuric acid of such concentration, that the iron is not dissolved.

According to the invention the reducing treatment is carried out at such temperature that the titanium compound (for example ilmenite) remains unaltered, while the iron oxide (f. inst. magnetite) is reduced to metallic iron and the vanadium and in case they are present the chromium compounds are rendered soluble to form alkali vanadate and in some cases alkali chromate.

By this treatment it has been found that the unaltered titanium compound is released and can, after lixiviating the soluble compounds, be separated from iron by magnetic separation. The temperature at which the treatment is carried out, is preferably about 800° C. The iron sponge is exempt of sulphur and phosphorus. From the gangue a titanium dioxide concentrate is produced in a known manner. The solution is treated in a known manner to produce f. inst. vanadic acid and chromic acid.

In treating special ores the addition of a sulphur compound is of advantage in order to improve the yield of vanadium.

After treatment of other types of ores according to the invention all or a part of the vanadium will form compounds insoluble in water, probably complex compounds of a lower degree of oxidation than the vanadate, whereby the titanium compound finally is obtained mixed with these insoluble vanadium compounds and in case it was used an excess of reduction agent. It has been found that this insoluble vanadium compound or compounds by roasting will be transformed into soluble vanadate and simultaneously the excess of reduction agent will be removed by oxidation. Hereby also the advantage is obtained that the extracted vanadate is obtained alone, and the first solution may then be treated for recovering sodium carbonate or other alkali salts.

The process is preferably carried out in closed vessels, in which the mixture is brought to reaction with supply of external heat. The reduction of the iron oxides of course may also be effected by means of reducing gases with or without admixed carbon in the charge, whereby a rotary kiln preferably is used, in which the reducing gases are conducted in counter-current relationship to the mixture. The process thereby will be continuous.

Example 1

As initial material a concentrated ore with the following analysis was used:

| Total Fe | Percent met. Fe | Percent TiO$_2$ | Percent V | Percent S |
|---|---|---|---|---|
| 64 | 0.0 | 5.5 | 0.83 | 3 |

One part of the ore was reduced with wood charcoal without addition of sodium carbonate at gradually increasing temperature from 500°–800° C. After lixiviating the magnetic concentrate had the following analysis:

| | Percent total Fe | Percent met. Fe | Percent V | Percent TiO$_2$ | Percent S |
|---|---|---|---|---|---|
| Test I | 70.6 | 2.7 | 0.94 | 6 | 1.50 |
| Test II | 74.1 | 17.0 | 1.04 | 7 | 1.40 |

Another part of the ore was subjected to the same treatment, but after addition of sodium carbonate, and the magnetic concentrate had the following composition:

| | Percent total Fe | Percent met. Fe | Percent V | Percent TiO₂ | Percent S |
|---|---|---|---|---|---|
| Test III | 93 | 90 | 0.10 | 0.6 | 0.10 |
| Test IV | 95 | 93 | 0.07 | 0.5 | 0.02 |

Hence, the quantity of reduced iron is increased from 2.7% and 17% to 90 and 93% respectively and also substantially all the vanadium and sulphur has been eliminated.

The process also includes the feature of subjecting the material reduced in a known manner to the treatment according to the invention.

*Example 2*

An iron sponge containing 93% Fe, 2% TiO₂, 1% V, 0.15% Cr was heated with soda ash in a reducing atmosphere at about 800° C., whereupon the material after cooling, lixiviating with water and magnetic separation was substantially free of V, Cr and TiO₂.

It is to be understood that the reducing treatment may be stopped at any moment, in case only partially reduced concentrates, exempt of impurities, are desired.

I claim:

1. A process for the treatment of iron ores containing vanadium and titanium which comprises the steps of reducing the ore in the presence of an alkali compound at temperatures ranging between about 500° to 800° C., whereby the iron present is reduced to the metallic state and the vanadium is converted into alkali vanadate while the titanium remains substantially unaltered, leaching the ore to dissolve the alkali vanadate, and subjecting the insoluble residue to a separation step for separating the iron from the titanium.

2. A process as claimed in claim 1 wherein the ore also contains chromium which is converted into alkali chromate and dissolved during leaching.

3. A process as claimed in claim 1 wherein the reduction of the ore takes place at 800° C.

4. A process as claimed in claim 1 wherein the ore also contains chromium which is converted into the alkali chromate and dissolved during leaching and wherein the reduction of the ore takes place at 800° C.

5. A process as claimed in claim 1 which includes the step of adding a sulphur compound to the ore before reduction.

6. A process for the treatment of magnetite ores containing vanadium and titanium which comprises the steps of reducing the ore in the presence of an alkali compound at temperatures within the range of about 500° to 800° C., whereby the iron is reduced to the metallic state and the vanadium is converted in part to a soluble alkali vanadate and in part to an insoluble alkali-vanadium compound, while the titanium remains substantially unaltered, leaching the ore to dissolve the soluble alkali vanadate, separating the insoluble residue by a magnetic treatment into an iron-containing portion and a portion containing the titanium and the insoluble alkali-vanadium compound, roasting the non-ferrous material to solubilize the insoluble alkali-vanadium compound and finally leaching the solubilized material to separate it from the titanium compound.

7. A process for the treatment of magnetite ores containing vanadium and titanium which comprises reducing such an ore in the presence of an alkali compound at temperatures sufficiently high to reduce the magnetite to metallic iron but below temperatures producing any substantial formation of soluble alkali titanium compounds, whereby the vanadium present is converted into alkali vanadate, leaching the reduced ore to remove the alkali vanadate and separating the iron from the remaining insoluble residues magnetically.

RAGNVALD ASAK.